United States Patent
Park et al.

(10) Patent No.: US 10,461,831 B2
(45) Date of Patent: Oct. 29, 2019

(54) CHANNEL STATE INFORMATION REPORT OF HIGH-SPEED MOVING USER EQUIPMENT

(71) Applicant: LG ELECTRONICS INC., Seoul (KR)

(72) Inventors: Kungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/569,739

(22) PCT Filed: Oct. 13, 2015

(86) PCT No.: PCT/KR2015/010773
§ 371 (c)(1),
(2) Date: Oct. 26, 2017

(87) PCT Pub. No.: WO2016/175401
PCT Pub. Date: Nov. 3, 2016

(65) Prior Publication Data
US 2018/0131429 A1     May 10, 2018

Related U.S. Application Data

(60) Provisional application No. 62/152,952, filed on Apr. 26, 2015.

(51) Int. Cl.
*H04B 7/06*    (2006.01)

(52) U.S. Cl.
CPC ........... *H04B 7/0626* (2013.01); *H04B 7/063* (2013.01); *H04B 7/0632* (2013.01); *H04B 7/0639* (2013.01)

(58) Field of Classification Search
CPC .................................................. H04B 7/0626
(Continued)

(56) References Cited

U.S. PATENT DOCUMENTS

| 2013/0003791 | A1 | 1/2013 | Tong et al. |
| 2013/0301454 | A1* | 11/2013 | Seol ............ H04B 7/043 370/252 |
| 2015/0172024 | A1* | 6/2015 | Kim ............ H04B 7/024 370/329 |

FOREIGN PATENT DOCUMENTS

| KR | 1020080017239 | 2/2008 |
| KR | 1020080021494 | 3/2008 |

(Continued)

OTHER PUBLICATIONS

PCT International Application No. PCT/KR2015/010773, Written Opinion of the International Searching Authority dated Feb. 23, 2016, 22 pages.

(Continued)

*Primary Examiner* — Shripal K Khajuria
(74) *Attorney, Agent, or Firm* — Lee, Hong, Degerman, Kang & Waimey

(57) ABSTRACT

The present invention relates to a method for efficiently supporting vehicle communication in a next-generation radio communication system, and a device therefor. To this end, a user equipment (UE) provides, to a central unit (CU) of the UE, primary channel state information measured by each of a plurality of antenna units that are disposed in distributed locations of the UE; determines any one of a plurality of receiving modes by considering the combined gain of the primary channel state information in the CU; determines a secondary channel state information according to the determined receiving mode; and reports, through a transceiver of the UE to the network, information indicative (Continued)

of the determined receiving mode and the determined secondary channel state information.

9 Claims, 9 Drawing Sheets

(58) Field of Classification Search
USPC ........................................................ 370/328
See application file for complete search history.

(56) References Cited

FOREIGN PATENT DOCUMENTS

| KR | 1020080043899 | 5/2008 |
|----|---------------|--------|
| KR | 1020100041908 | 4/2010 |
| KR | 1020120093027 | 8/2012 |
| WO | 2014021677    | 2/2014 |

OTHER PUBLICATIONS

European Patent Office Application Serial No. 15890842.6, Search Report dated Nov. 28, 2018, 17 pages.

* cited by examiner

CHANNEL STATE INFORMATION REPORT OF HIGH-SPEED MOVING USER EQUIPMENT

CROSS-REFERENCE TO RELATED APPLICATIONS

This application is the National Stage filing under 35 U.S.C. 371 of International Application No. PCT/KR2015/010773, filed on Oct. 13, 2015, which claims the benefit of U.S. Provisional Application No. 62/152,952, filed on Apr. 26, 2015, the contents of which are all hereby incorporated by reference herein in their entirety.

TECHNICAL FIELD

The following description relates to a method and apparatus for efficiently reporting channel state information of a user equipment (UE) moving at high speed in a next-generation wireless communication system and, more particularly, to a method and apparatus for reporting channel state information to efficiently support cooperative reception between distributed antenna arrays by an in-vehicle UE to which a distributed antenna array scheme is applied.

BACKGROUND ART

In the conventional mobile communication system for mainly serving personal mobile communication devices, there is an inversely proportional relationship between the speed of the UE and required data rate and quality of service (QoS). As such, the conventional communication system is configured to provide high data rate/QoS for a low speed UE, and to provide reliable service without radio link failure for a high speed UE even if the data rate/QoS is somewhat low.

In a next generation communication system, there is a need for high data rate/QoS for the high speed UE, since the scope of the required service increases. For example, the users in the vehicle or public transportation would like to enjoy multimedia services during the drive on a highway. Also, users want to enjoy multimedia services more while the speed of the vehicle is high.

This is a new model which does not exist in conventional wireless communication service models. To support this, mobile communication networks need to be enhanced to a revolutionary level or a new system capable of realizing the new model without affecting network infrastructures needs to be designed.

In next-generation mobile communication systems, V2X (Vehicle-to-Infrastructure/Vehicle/Nomadic) communication technology for supporting efficient vehicle communion is under discussion. V2X communication includes communication between a vehicle and infrastructure (V2I) and communication between vehicles (V2V).

When a large antenna array is provided to the outside of a vehicle in order to provide a high quality communication service to high speed vehicles, aesthetic/aerodynamic problems are generated and thus research into vehicle antennas for replacing the large antenna array is required.

In addition, when a plurality of distributed antenna arrays is used for reasons of installation in a vehicle, a method of reporting channel state information to efficiently support cooperative reception in each antenna array needs to be considered.

DETAILED DESCRIPTION OF THE INVENTION

Technical Problems

An efficient reporting channel state method and a UE configuration therefor in order to support high-quality vehicular communication services will be described.

Technical Solution

According to an aspect of the present invention, provided herein is a method of reporting channel state information (CSI) by a user equipment (UE) in a wireless communication system, including transmitting primary CSIs measured in a plurality of antenna units positioned at distributed locations of the UE to a central unit of the UE, determining one of a plurality of reception modes in consideration of combined gain of the primary CSIs by the central unit and determining secondary CSI according to the determined reception mode, and reporting information indicating the determined reception mode and the determined secondary CSI through a transceiver of the UE to a network.

The reception modes may include two or more of a first reception mode for causing the antenna units to receive the same information; a second reception mode for causing the antenna units to receive different information of antenna units having channel orthogonality of a predetermined level or more; and a third reception mode corresponding to a combination of the first reception mode and the second reception mode.

The primary CSIs may include a predetermined number of rank indicator (RI), precoding matrix index (PMI), and channel quality indicator (CQI) sets having quality of a predetermined level or more, and the central unit may determine the secondary CSI, based on a set having a common RI and a common PMI among the primary CSIs.

When a plurality of sets having the common RI and the common PMI is present, the secondary CSI may be determined in consideration of combined gain.

The primary CSIs may include a predetermined number of rank indicator (RI), precoding matrix index (PMI), and channel quality indicator (CQI) sets having quality of a predetermined level or more, and when a set having a common RI and a common PMI is not present among the primary CSIs, the central unit may determine the secondary CSI in consideration of a combination of transmission beams corresponding to the RI, PMI, and CQI sets of the primary CSIs.

The primary CSIs may include information indicating correlation between a predetermined number of rank indicator (RI), precoding matrix index (PMI), and channel quality indicator (CQI) sets having quality of a predetermined level or more and transmission beams.

The method may further include receiving information about selection of the reception modes from the network.

The central unit may determine the secondary CSI in consideration of quality parameters indicating link stability and data rate.

In another aspect of the present invention, provided herein is a user equipment (UE) operating in a wireless communication system, including a plurality of antenna units positioned at distributed locations of the UE; a central unit connected to the antenna units to determine one of a plurality of reception modes in consideration of combined gain of primary CSIs measured in the antenna units and determine secondary CSI according to the determined reception mode;

and a transceiver connected to the central unit to report information indicating the reception mode determined by the central unit and the determined secondary CSI to a network.

Each of the antenna units may be configured to generate a predetermined number of rank indicator (RI), precoding matrix index (PMI), and channel quality indicator (CQI) sets having quality of a predetermined level or more, as the primary CSIs.

Each of the antenna units may be configured to additionally generate information indicating correlation between each of the predetermined number of RI, PMI, and CQI sets and a transmission beam.

The central unit may be configured to determine the secondary CSI based on a set having a common RI and a common PMI among the CSIs.

When a set having a common RI and a common PMI is not present among the primary CSIs, the central unit may be configured to determine the secondary CSI in consideration of a combination of transmission beams corresponding to the RI, PMI, and CQI sets of the primary CSIs.

The central unit may be configured to determine the secondary CSI in consideration of quality parameters indicating link stability and data rate.

Advantageous Effects

According to the present invention, channel state information can be efficiently reported to support an in-vehicle communication service of high quality.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method and apparatus for efficiently providing mobility management to a UE for vehicles to which a distributed antenna array is applied in a next-generation wireless communication system.

Distributed Antenna Array

As described above, a vehicular MIMO system in which a large size antenna array is installed in a vehicle such that a high-quality service can be provided to the vehicle through a large array gain even when the vehicle moves at a high speed, and a central unit of the vehicle relays received data to a passenger is considered in order to provide efficient vehicular communication.

When the large size antenna array is installed outside of the vehicle and radio communication is relayed between a base station and a passenger in the vehicle through the large size antenna array, communication performance deterioration due to penetration loss having an average value of about 20 dB can be prevented, a large array gain can be secured by using a larger number of Rx antennas than a personal mobile communication device, and a distance between Rx antennas can be easily secured to easily obtain Rx diversity.

According to the aforementioned features, vehicular MIMO can provide communication services superior to personal mobile devices without additional infrastructure investment Despite the above-described advantage, there is no example in which a large antenna array is installed in a vehicle. Since a vehicle is a considerably expensive apparatus compared to personal mobile communication devices, is difficult to enhance and upgrade, and needs to satisfy many requirements such as design concept, aerodynamic structure and the like in addition to communication performance, it is not easy to install the large antenna array which aesthetically/aerodynamically limits vehicle design. Vehicle manufacturers use a combined antenna having lower performance than a single antenna in order to eliminate visual inconvenience due to existing antennas.

Figure 1:
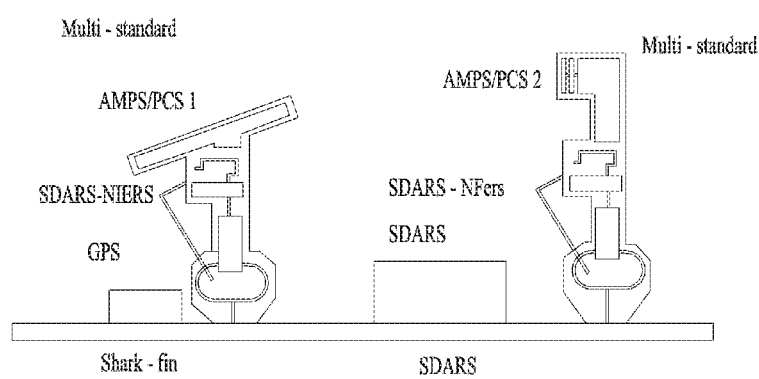
FIG. 1 shows a structure of a conventional shark antenna system for vehicular communication.

FIG. 1 shows a structure of conventional shark antenna system for vehicular communication.

In FIG. 1, the shark antenna includes combined structure for 4 or more different band/services in one antenna.

However, this shark antenna is a combined antenna having lower performance than a single antenna, which is used by vehicle manufacturers in order to eliminate visual inconvenience due to existing antennas, as described above, and thus is insufficient to provide high-quality vehicular communication.

Accordingly, one aspect of the present invention considers installation of a distributed antenna array system for realizing an arrayed antenna system through multiple arrays instead of a single array in a vehicle in order to overcome spatial restriction of a large array antenna.

Figure 2:
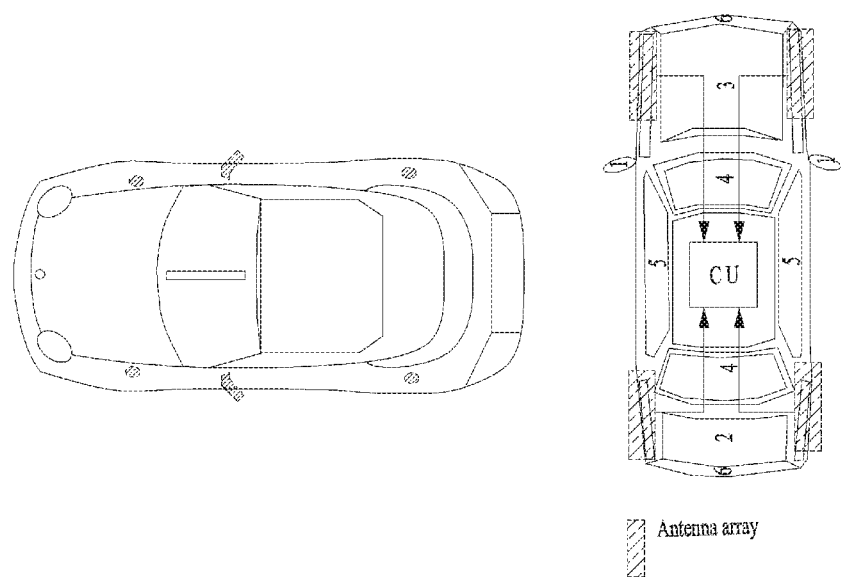
FIG. 2 shows a concept of an in-vehicle DAS system installed in a car.

FIG. 2 shows a concept of an in-vehicle DAS system installed in a car.

Antennas having various forms and emission patterns depending on installation positions are disposed at distributed positions, and a central unit for controlling transmission and reception of signals in an integrated manner through the antennas may be installed as shown in FIG. 2. According to this configuration, a reception (Rx) diversity gain can be maximized using the antenna array and a situation in which wireless connection between a base station and a vehicle receiver is interrupted during high-speed movement causing abrupt communication environment change can be prevented through cooperative reception of antennas having different emission patterns.

Figure 3:
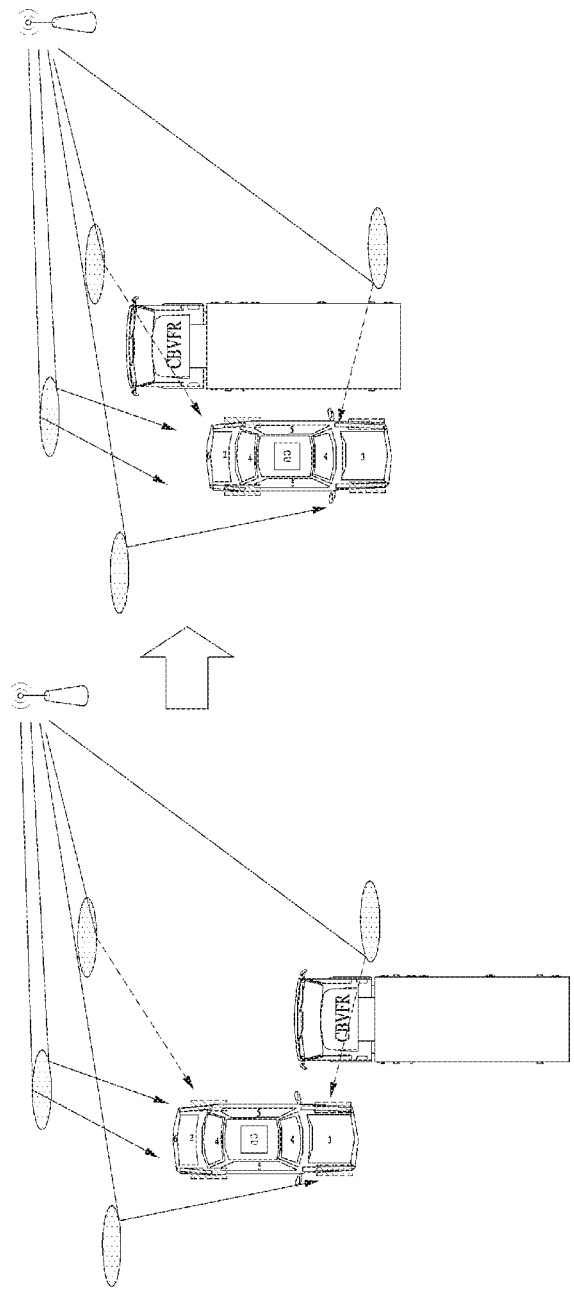
FIG. 3 schematically illustrates the reason why a distributed antenna system is more suitable to prevent link failure than conventional systems when ray-block is generated due to vehicle movement.

FIG. 3 schematically illustrates the reason why a distributed antenna system is more suitable to prevent link failure than conventional systems when ray-block is generated due to vehicle movement.

In vehicular communication, when an obstacle such as a truck moves at one side of a vehicle at a speed similar to that of the vehicle and thus a beam is received only in the direction in which the truck moves, communication failure may occur for a considerable time.

However, when the aforementioned distributed antenna system is applied as shown in FIG. 3, a beam received from a network device may have various paths and thus a problem that an obstacle moving at one side of a vehicle directly affects communication can be mitigated.

In FIG. 3, a network device which transmits signals to a UE for vehicles may be a conventional eNB or a roadside device installed for vehicular communication. In addition, signals from the network device may be directly received by the UE for vehicles or reflected by a specific reflector and received.

A distributed antenna system (DAS) is favorable for securing link stability and is extremely appropriate to application to vehicular communication capable of supporting a high data rate when high antenna array gain achieved through the DAS is ensured. However, the above distributed deployment structure is disadvantageous in that lossless cables should be installed between antennas and a central unit. If each distributed antenna or sub-array antenna serves to receive a radio frequency (RF) band signal and then simply forward the received signal to the central unit, a cable used for a high frequency band should be installed between each antenna and the central unit so as to share an RF band signal. However, it is difficult to implement the cable because it is not only high in cost but also sensitive to physical stimulus such as movement or shock. In addition, when failure occurs at a receiving end, it is very difficult to restore the receiving end. To solve the above problems, an embodiment of the present invention proposes implementing an in-vehicle DAS used in a vehicle in such a manner of installing a modem which operates independently in each distributed antenna or sub-array antenna or causing each sub-array to independently perform a part of a reception operation and then to share a baseband signal, a soft value, a digitally processed signal, etc. with the central unit.

Problem of Current Cell Selection Method

As described above, the distributed array antenna is an array solution suitable for mobile communication for vehicles which can enhance Rx power gain by realizing a large array antenna and overcome communication performance deterioration and link failure during ray-block. However, to obtain an actual gain through the aforementioned antenna structure in a mobile communication system, an access control method appropriate for the antenna structure needs to be applied. A conventional access control method which mainly uses a personal mobile communication device using a single antenna array is an Rx power based access control method which relatively compares Rx powers of cell search reference signals transmitted from eNBs to select an eNB most suitable to provide services to each UE and does not provide abundant rays required to prevent performance deterioration due to ray-block and a function of comparing Rx diversity gains.

Figure 4:
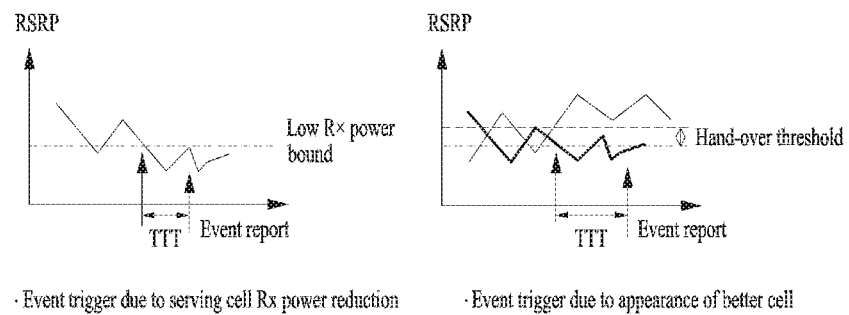
FIG. 4 illustrates conventional radio resource monitoring (RRM) for eNB/cell selection.

FIG. 4 illustrates a conventional radio resource monitoring (RRM) method for eNB/cell selection.

To request eNB/cell change from an eNB to which a UE is currently connected, an "event" indicating that eNB/cell change may be needed needs to be triggered. The event is triggered 1) when Rx power of a cell search reference signal of a serving cell decreases below an appropriate value and thus access point change to another eNB/cell needs to be considered, 2) when "a cell search reference signal of a cell other than the serving cell is received with higher power than the cell search reference signal of the serving cell for a predetermined time" and thus it is determined that an eNB/cell, which is more suitable to be used as an access point than the current serving cell, exists, or 3) when the aforementioned two situations simultaneously/sequentially occur.

When the event occurs, a network or a serving cell eNB may request that the UE measure and report more detailed channel state, perform/instruct serving cell change, or determine that the current serving cell is maintained in consideration of various network factors that are not recognized by the UE, such as traffic balancing.

Figure 5:
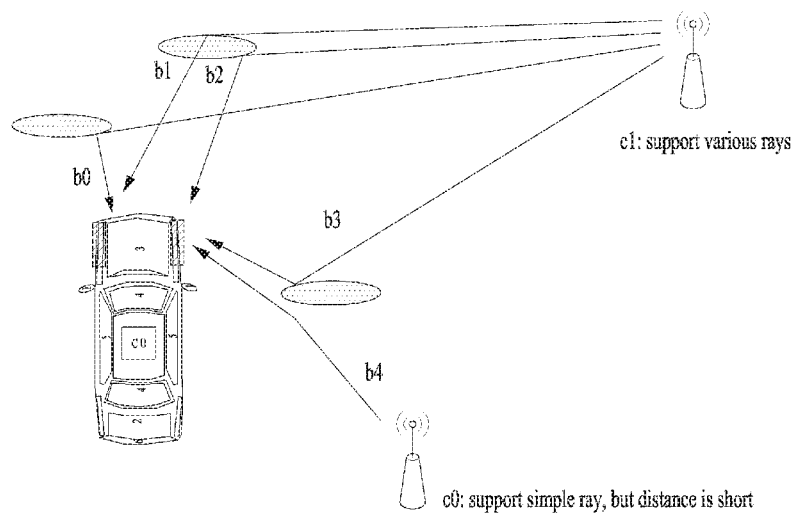
FIG. 5 illustrates problems of a conventional Rx power based cell selection method and a cell selection method proposed in an embodiment of the present invention.

FIG. 5 illustrates a problem of a conventional Rx power based cell selection method and a cell selection method proposed in an embodiment of the present invention.

In FIG. 5, although a vehicle is close to a first cell c0 and thus measures and reports high Rx power for a cell search reference signal of c0, only one ray exists between the vehicle and c0 so that link failure may occur when an object that obstructs the ray appears.

A second cell c1 a relatively longer distance from the vehicle cannot provide high Rx power to the vehicle but can support communication through various 'rays" and thus can stably secure a link even when a communication blocker appears. When the vehicle moves at a high speed, cell selection in consideration of the aforementioned "ray distribution" information needs to be performed.

Problems of CSI Measurement and Reporting in in-Vehicle DAN

In order for a transmission end to generate beams suitable for reception, the transmission end needs to be aware of information about a channel and to accurately measure proper beams and gain during use of beams, based on the channel information. The channel may be measured using a scheme in which a reception end transmits an additional pilot signal to the transmission end. However, in currently available mobile communication, the reception end measures the channel and then reports the channel information to the transmission end in the form of channel state information (CSI). During MIMO implementation, a channel may be defined as a combination of sub-channels generated between a plurality of transmission and reception antennas and has a more complicated form as the number of antennas used for MIMO implementation increases. According to a scheme of measuring a channel and reporting CSI, CSI reporting is broadly divided into 1) an explicit CSI reporting scheme and 2) an implicit CSI reporting scheme.

In the explicit CSI reporting scheme, the receiving end reports information maximally approximating to a measurement value to the transmission end without an interpretation process for a measured channel. Various schemes for CSI reporting, for example, a quantization scheme of a MIMO channel represented in the form of a matrix or a singular value decomposition (SVD) computation scheme, are used to reduce signaling overhead.

In the implicit CSI reporting scheme, the reception end interprets information about a measured channel and extracts and reports only substantial contents needed when the transmission end generates beams, instead of transmitting the information about the measured channel. Since the implicit CSI reporting scheme has an advantage of less signaling overhead for CSI reporting as compared with the explicit CSI reporting scheme, the implicit CSI reporting scheme is widely used in a current mobile communication system.

In the case of an implementation-friendly in-vehicle DAS in which distributed sub-array antennas independently perform a primary reception operation and a central unit (CU) performs a secondary reception operation by collecting primary processed signals, transmission beams should satisfy the following two conditions.

First, the transmission beams should be capable of guaranteeing data reception of the sub-array antennas performing the primary reception operation.

Second, the transmission beams should be designed such that the secondary reception operation of the CU can provide additional gain relative to the primary reception operation.

To this end, when a UE reports CSI, the UE should generate reporting information about the CSI including information about proper transmission beams for each sub-array and also report information about channel association between the sub-arrays so as to obtain additional gain through the secondary reception operation. This necessarily causes increase in signaling overhead of CSI reporting and the signaling overhead may have a serious problem threatening system stability in the case in which there are numerous sub-arrays or there are numerous antennas constituting a sub-array.

Accordingly, an aspect of the present invention proposes a method of measuring CSI and a method of reporting a result of measurement, capable of guaranteeing beam reception performance of each sub-array and guaranteeing performance gain of secondary reception, in an in-vehicle DAS system in which each sub-array performs an individual reception operation (primary reception) and a CU performs combining (secondary reception) of primarily interpreted signals. The present invention also proposes an embodiment using a conventional implicit CSI reporting scheme in order to maintain signaling overhead of CSI reporting at a proper level.

To this end, according to an embodiment of the present invention, a UE (specifically, a CU) collects channel (proper transmission beam) information of each sub-array to determine a reception scheme/mode and determines the contents/mode of channel reporting suitable for the reception scheme/mode.

Figure 6:
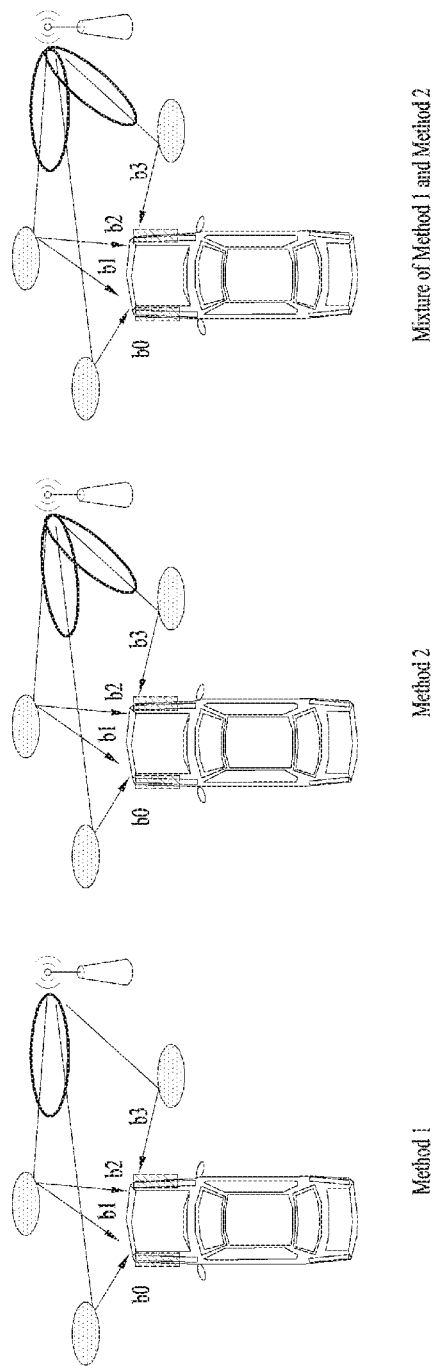
FIG. 6 is a diagram conceptually illustrating reception schemes usable by a UE according to an embodiment of the present invention.

FIG. 6 is a diagram conceptually illustrating reception schemes usable by a UE according to an embodiment of the present invention.

The UE or the CU of the UE may use one of first and second reception schemes/modes or use a combination of the two reception schemes/modes in such a manner of receiving a part of multiple simultaneously received data (layers) according to the first scheme/mode and receiving the other layers according to the second scheme/mode.

The first reception scheme/mode: After causing two or more sub-arrays to receive the same information (layer), the CU combines a result of primary reception for the same layer, as illustrated in Method 1 of FIG. 6, thereby increasing reliability.

The second reception scheme/mode: Different information (layers) are allocated to sub-arrays having high channel orthogonality as illustrated in Method 2 of FIG. 6, thereby increasing data rate.

In an operation of a legacy mobile communication system, a reception scheme or mode (e.g., closed loop MIMO based reception or open loop MIMO based reception) need not be rapidly changed. Therefore, an eNB has semi-persistently adjusted a transmission mode and a reception mode in consideration of channel states of a plurality of UEs. However, in an in-vehicle MIMO communication system that the present invention considers, since a channel may be changed remarkably fast and high-rate information transmission should be supported while stably maintaining a link in a channel-varying situation, much faster change of a reception scheme than change of a conventional scheme should be supported. Therefore, a reception scheme/mode needs to be determined not by an eNB but by a UE that actually performs reception and a beam/CSI calculation scheme needs to be applied in the form suitable for supporting the determined reception scheme/mode. Since the contents of CSI reporting are varied according to change of the reception scheme/mode, if implicit CSI reporting such as codebook based CSI reporting is performed in order to reduce signaling overhead of CSI reporting, the UE needs to separately inform the eNB that the contents of CSI reporting have been changed through change of a CSI reporting mode.

Figure 7:
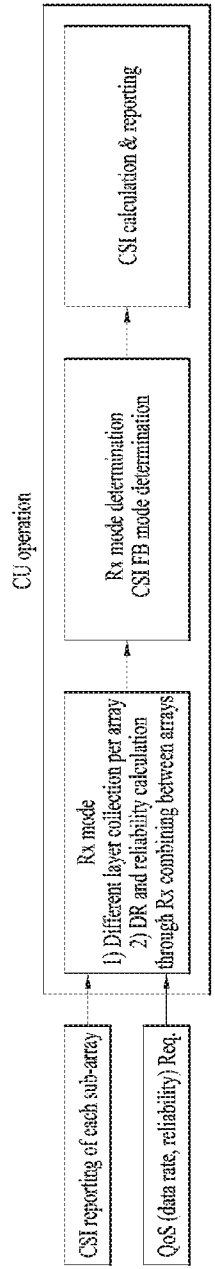
FIG. 7 illustrates an overview of a process of determining, by the CU of the UE, the reception scheme/mode and the contents/mode of CSI reporting according to QoS requirements such as link reliability and data rate, demanded for CSI measurement and communication of each sub-array.

FIG. 7 illustrates an overview of a process of determining, by the CU of the UE, the reception scheme/mode and the contents/mode of CSI reporting according to QoS requirements such as link reliability and data rate, demanded for CSI measurement and communication of each sub-array.

Specifically, the UE may receive primary CSI reporting from each sub-array and simultaneously obtain QoS requirement information about data, rate, and reliability. The QoS information may also be received from a network.

Upon obtaining the QoS information, the CU may determine which one of Method 1 to Method 3 of FIG. 6 is used in association with a reception mode and how to deal with a CSI feedback mode.

FIRST EMBODIMENT

In an embodiment of the present invention, each sub-array shares primary CSI with the CU in an implicit reporting format such as rank indicator (RI), precoding matrix index (PMI), and channel quality indicator (CQI) set(s) and the CU determines the contents and mode of CSI reporting by selecting an optimal RI, PMI, and CQI set from among the RI, PMI, and CQI set(s).

Specifically, to guarantee an independent operation of each sub-array and reduce difficulty of implementation, when each sub-array reports channel information to the CU, an implicit CSI reporting scheme used by the CU of a current mobile communication system for channel information reporting may be used. That is, after measuring a channel, each sub-array may select beam(s) suitable to be applied to the channel as one or multiple candidates from among candidates specified by a predesigned codebook, estimates beamforming gain or reception reliability (channel quality) which is expected to be provided when the beams are used, and reports the estimated beamforming gain or reception reliability (channel quality) to the CU.

More specifically, the channel information may be transmitted to the CU in the format of:

1) when a single codebook is used, the number of beams, indication indexes of beams, and expected channel quality (RI, PMI, and/or CQI)

2) when multiple codebooks are used, a codebook index, the number of beams, indication indexes of beams, and expected channel quality (CBI, RI, PMI, and/or CQI)

In addition, when each sub-array reports the channel information to the CU according to the scheme of 1) or 2), multiple CSI sets, rather than one CSI set, may be generated by the above scheme. For example, each sub-array may report a plurality of CSI sets in order of expected CQI size as follows.

<CSI Reporting of Sub-Array 1>
best: RI=1, PMI=2, CQI=9
2nd: RI=1, PMI=6, CQI=4
<CSI Reporting of Sub-Array 2>
best: RI=1, PMI=6, CQI=7
2nd: RI=1, PMI=2, CQI=6

In the above example, the two sub-arrays exhibit superior reception performance with respect to both RI=1 and PMI=2/6. The CU may estimate that the case in which beams are transmitted according to RI=1 and PMI=2 from the RI, PMI, and CQI information exhibits better reception performance (higher combined CQI) after the CU performs a secondary reception operation for signal combining than the case in which beams are transmitted according to RI=1 and PMI=6. From among two CSI sets reported by each sub-array through the above determination, the CU 1) selects a CSI set of RI=1, PMI=2, and CQI=0, 2) calculates a combined CQI by estimating a CQI when primary reception signals of two sub-arrays are combined in the CU, and 3) reports the selected RI=1, PMI=2, and CQI=combined CQI to the eNB.

In the above example, the UE may report the fact that sub-arrays 1 and 2 select a reception scheme/mode for receiving the same beam to the eNB through a scheme of an Rx mode index, etc.

SECOND EMBODIMENT

In the second embodiment, each sub-array may share channel information with the CU in an implicit reporting format of RI, PMI, and CQI set(s) and the CU may determine the contents and mode of CSI reporting by combination of beams indicated by the information.

The first embodiment is the simplest implementation example and specifies the case in which CSI sets reported by two or more sub-arrays include the same RI and PMI.

1) When there are no sub-arrays that report the same RI and PM, or 2) when a sub-array reports an RI and a PMI corresponding to multiple ranks, the CU needs to generate a CSI set indicating a new RI and PMI, rather than an RI and PMI reported by a sub-array, by interpreting information about the CSI sets and report the generated CSI set to the eNB.

As an example, the CU may report a PMI supporting multiple ranks by two sub-arrays as best CSI sets as follows:

<CSI Reporting of Sub-Array 1>
best: RI=2, PMI=1, CQI=9
2nd: RI=2, PMI=5, CQI=4
<CSI Reporting of Sub-Array 2>
best: RI=2, PMI=3, CQI=7
2nd: RI=2, PMI=8, CQI=6

Each sub-array reports a different PMI. In the above example, the CU needs to interpret a transmission beam demanded by each sub-array.

Figure 8:
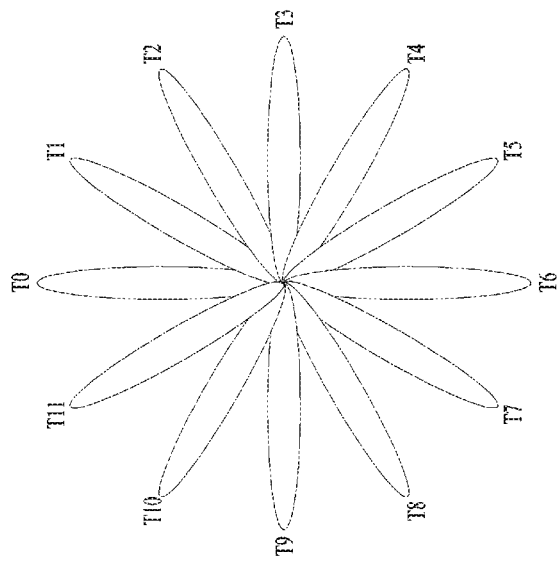
FIG. 8 is a diagram referred to for explaining a method of interpreting, by a CU, a transmission beam demanded by each antenna array according to an embodiment of the present invention.

FIG. 8 is a diagram referred to for explaining a method of interpreting, by a CU, a transmission beam demanded by each antenna array according to an embodiment of the present invention.

As illustrated in FIG. 8, when a codebook used for CSI calculation is configured by combination of 1, 2, . . . , N beams having transmission angles AoD=0, pi/4, 2pi/4, . . . , the CU may acquire information about a transmission beam preferred by each sub-array by interpreting the contents of the CSI sets. A result of interpretation is as follows.

<Sub-Array 1>
best: T1 & T3, CQI=9 when two beams are used.
2nd: T5 & T7, CQI=4 when two beams are used.
<Sub-Array 2>
best: T3 & T5, CQI=7 when two beams are used.
2nd: T8 & T10, CQI=6 when two beams are used.

Through the above interpretation, when the two sub-arrays use the transmission beam T3, the CU may effectively receive data, and even when the two sub-arrays use the transmission beam T5, the CU may acquire a high CQI. Based on the above interpretation, the CU may define a new CSI set, particularly, an RI and a PMI different from those used for reporting by the sub-arrays, using the following schemes and report the newly defined RI and PMI to the eNB.

1) In the above example, the CU generates an RI and a PMI which are commonly included in CSI sets of the two sub-arrays and indicate the transmission beam T3 guaranteeing best performance as RI=1 and PMI=3 and reports the generated RI and PMI together with a combined CQI.

2) The CU generates a CSI set indicating T3 and T5, which are common beams, and reports the generated CSI set to the eNB.

Unlike this scheme, when it is determined that an abrupt channel variation does not occur because beamforming gain is high or a moving speed of a UE is slow, even with respect to beams T7, T8, and T10 received only through one sub-array upon receiving the above CSI sets, the CU may generate a CSI set including the above transmission beams and report the generated CSI set to the eNB. This corresponds to the case in which the CU determines to use a combination of the first reception scheme/mode and the second reception scheme/mode. For example, if the CU determines to use T7 as well as T3 and T5 as transmission beams, the CU generates a CSI set using RI=3 and PMI=X (where X is a value corresponding to a rank-3 PMI that T3, T5, and T7 simultaneously use) and reports the generated CSI set.

THIRD EMBODIMENT

As the third embodiment, each sub-array transmits information about correlation between beams such as a representative angle of arrival (AoA) value per RI, PMI, and CQI set or per proper transmission beam to the CU so that the CU may refer to the information upon generating a multi-rank RI, PMI, and CQI.

Even when each sub-array reports only CSI sets corresponding to RI=1, the CU may interpret the CSI sets to determine multi-rank transmission of rank 2 or more and calculate and report CSI corresponding to multi-rank transmission. For example, as in the first embodiment, the CU requests that the eNB perform rank-2 transmission which simultaneously uses a transmission beam corresponding to RI=1 and PMI=2 and a transmission beam corresponding to RI=1 and PMI-6, through CSI reporting, in a situation in which each sub-array has reported rank-1 CSI sets as in First Embodiment.

To determine such an operation, when each sub-array simultaneously performs 1) data reception through the transmission beam corresponding to RI=1 and PMI=2, and 2) data reception through the transmission beam corresponding to RI=1 and PMI=6, the CU should be able to determine that interference does not occur between the two data or layers. To aid in the above determination, each sub-array may additionally report information about correlation between transmission beams such as an AoA value of each transmission beam or AoA values of a plurality of transmission beams specified by combination of an RI and a PMI, upon reporting CSI. For example, each sub-array reports an AoA value, such as <CSI Reporting of Sub-Array 1>
best: RI=1, PMI=2, CQI=9, AoA=30
2nd: RI=1, PMI=6, CQI=4, AoA=−40
<CSI Reporting of Sub-Array 2>
best: RI=1, PMI=6, CQI=7, AoA=0
2nd: RI=1, PMI=2, CQI=6, AoA=−30

Each sub-array may cause the CU to identify that two transmission beams expressed as RI=1 and PMI=2, and RI=1 and PMI=6 can be simultaneously received by two sub-arrays because incident angles of the two transmission beams differ. Alternatively, each sub-array may directly transmit, information such as <CSI Reporting of Sub-Array 1>
best: RI=1, PMI=2, CQI=9,
beams having difficulty in being simultaneously received when used together due to occurrence of interference: RI=1 and PMI=7, RI=2 and PMI=9, . . . .
2nd: RI=1, PMI=6, CQI=4, AoA=−40
beams having difficulty in being simultaneously received when used together due to occurrence of interference: RI=1 and PMI=1, RI=2 and PMI=11, . . . .
<CSI Reporting of Sub-Array 2>
best: RI=1, PMI=6, CQI=7, AoA=0
beams having difficulty in being simultaneously received when used together due to occurrence of interference: RI=1 and PMI=12,
2nd: RI=1, PMI=2, CQI=6, AoA=−30
beams having difficulty in being simultaneously received when used together due to occurrence of interference: RI=2 & PMI=9, . . . , indicating information about beams that cannot be simultaneously used or information about beams that are recommended to be used, to the CU.

FOURTH EMBODIMENT

As the fourth embodiment, determination of a reception scheme/mode of the CU and determination of the contents/mode of CSI reporting may reflect a plurality of communication quality requirement parameters such as link stability and data rate.

That is, when two sub-arrays report the following CSI sets to the CU and the CU determines the reception scheme/mode and the contents/mode of CSI reporting using a CSI set selection scheme, the contents of reporting is as follows.

<CSI Reporting of Sub-Array 1>
best: RI=1, PMI=2, CQI=12
2nd: RI=1, PMI=11, CQI=4
3rd: RI=1, PMI=6, CQI=2
<CSI Reporting of Sub-Array 2>
best: RI=1, PMI=6, CQI=7
2nd: RI=1, PMI=9, CQI=6
3rd: RI=1, PMI=8, CQI=5 then the CU may receive data through two sub-arrays upon forming and transmitting a beam as RI=1 and PMI=6, thereby securing link stability. Meanwhile, the CU may recognize that formation and transmission of a beam as RI=1 and PMI=2 is more favorable in terms of expected data rate. In this case, 1) when a UE is receiving a service requiring very high link stability or is in a situation in which link stability securement is difficult because of fast movement of the UE, a link stability requirement parameter value indicating a degree of importance of link stability may be set to be high, and.

2) when the UE is receiving a service continuously requesting high data rate or is in a situation having difficulty in securing multiple ranks, a data rate requirement parameter value indicating a degree of importance of data rate may be set to be high.

Based on the above two operations, the CU may select a reception scheme/mode which reflects a QoS requirement by selecting RI=1 and PMI=6 when link stability is more important and selecting RI=1 and PMI=2 when data rate is important. The contents/mode of CSI reporting is determined according to the selected reception scheme/mode.

In the above example, while the reception scheme/mode has been exemplarily selected using a scheme of selecting a more important one of the two QoS requirements, the present invention is not limited to such a hard decision scheme. For example, a combined CQI (CQI_reliability) upon selecting RI=1 and PMI=6 to secure link stability is compared with a combined CQI (CQI_reliability) upon selecting RI=1 and PMI=2 to guarantee data rate. If Equation 1 is satisfied as a result of comparison, the CU may select RI=1 and PMI=6 as a reception scheme/mode of a more flexible scheme.

$$CQI\_data\ rate - CQI\_reliability < TH\_DR \qquad \text{[Equation 1]}$$

Figure 9:
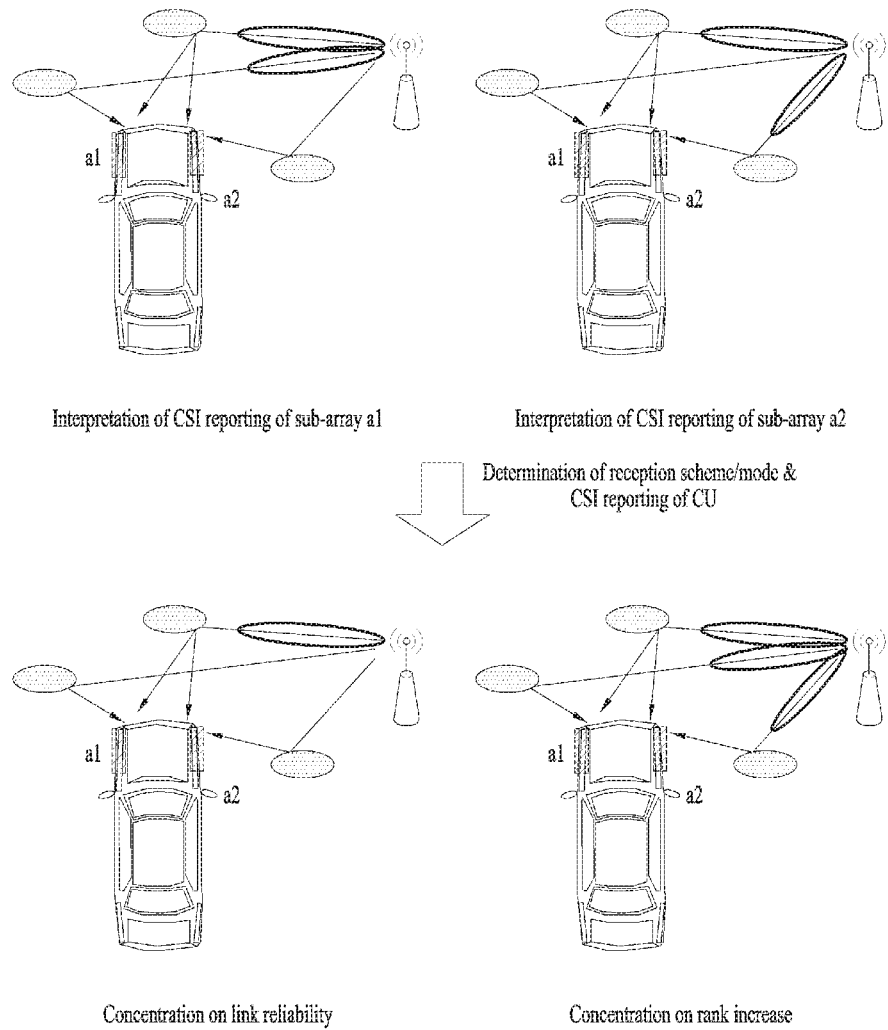
FIG. 9 illustrates an overall operation of a CU described in the embodiments of the present invention.

FIG. 9 illustrates an overall operation of a CU described in the above-described embodiments of the present invention.

Specifically, the CU receives multi-rank CSI from each sub-array and determines a reception scheme/mode and the contents of CSI reporting by interpreting the multi-rank CSI.

Meanwhile, in an embodiment of the present invention, an eNB may inform the UE of parameters for performance determination, such as recommended data rate and minimum reliability, in the form of an RRC signal, when the UE determines a reception scheme/mode based on reception performance.

In the above embodiments, upon determining the reception scheme/mode, the CU of the UE considers a QoS requirement value or a QoS requirement parameter value. The value may differ according to a service type that the UE uses, a mobile state of the UE, a serving cell, and a surrounding situation. Accordingly, it is desirable that the eNB inform the UE of variation in such an environment so that the UE may determine a suitable reception scheme/mode. The eNB may transmit the value to the UE using a scheme for remarkably emphasizing one QoS such as data_rate_on=[0, 1] or High_reliability_on=[0,1] during selection of the reception scheme/mode or a scheme for indicating a threshold (TH_DR) value of the fourth embodiment such as TH-DR_over_reliability=[3]dB.

Figure 10:
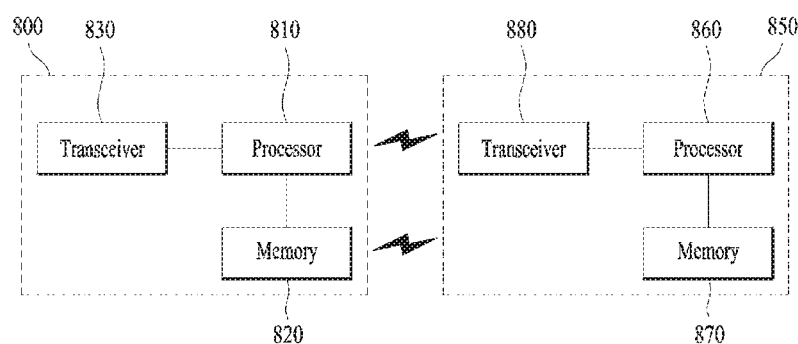
FIG. 10 illustrates an apparatus for performing the methods according to embodiments of the present invention.

FIG. 10 illustrates an apparatus for performing the methods according to embodiments of the present invention.

A radio apparatus 800 shown in FIG. 10 may correspond to the aforementioned UE installed in a specific vehicle as described above and a radio apparatus 850 may correspond to the aforementioned network device (eNB/cell).

The UE may include a processor 810, a memory 820 and a transceiver 830 and the eNB 850 may include a processor 860, a memory 870 and a transceiver 880. The transceivers 830 and 880 transmit/receive radio signals and may be executed in the physical layer of 3GPP and the like. Particularly, the transceiver of the UE 800 in the vehicle may include a plurality of antenna sub-arrays and a central unit (CU) for controlling the antenna sub-arrays for the aforementioned distributed antenna system as illustrated in FIG. 2.

The processors 810 and 860 are executed in the physical layer and/or the MAC layer and are connected to the transceivers 830 and 880. The processors 810 and 860 may perform the aforementioned UE mobility management method. In addition, the processor of the UE 800 in the vehicle may include the CU illustrated in FIG. 2 or control the CU.

The processors 810 and 860 and/or the transceivers 830 and 880 may include a specific application-specific integrated circuit (ASIC), another chipset, a logic circuit and/or a data processor. The memories 820 and 870 may include a ROM (Read-Only Memory), a RAM (Random Access Memory), a flash memory, a memory card, a storage medium and/or another storage unit. When an embodiment is executed by software, the aforementioned methods may be executed as modules (e.g., processors or functions) which execute the aforementioned functions. The modules may be stored in the memories 820 and 870 and executed by the processors 810 and 860. The memories 820 and 870 may be provided to the inside or outside of the processors 810 and 860 or connected to the processors 810 and 860 through a known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims.

INDUSTRIAL APPLICABILITY

As described above, the present invention is applicable to various communication systems using a high-speed UE such as vehicular communication.

What is claimed is:

1. A method of reporting channel state information (CSI) by a user equipment (UE) in a wireless communication system, the method comprising:
measuring primary CSIs in a plurality of antenna units positioned at distributed locations of the UE;
determining reception modes for each of the antenna units based on combined gain of the primary CSIs and determining secondary CSI based on the determined reception mode; and
reporting information on the determined reception mode and the determined secondary CSI to a network,
wherein the primary CSIs include a predetermined number of rank indicator (RI), precoding matrix index (PMI), and channel quality indicator (CQI) sets having quality of a predetermined level or more,
wherein the secondary CSI is determined based on a data rate requirement parameter value and a link stability requirement parameter value,
wherein the link stability requirement parameter value is related to a degree of importance of link stability and the data rate requirement parameter value is related to a degree of importance of data rate,
wherein the secondary CSI is determined based on a set having a common RI and a common PMI among the primary CSIs, when a difference between the data rate requirement parameter value and the link stability requirement parameter value is less than a threshold, and
wherein the secondary CSI is determined based on a set having a largest CQI among the primary CSIs, when the difference between the data rate requirement parameter value and the link stability requirement parameter value is equal to or greater than the threshold.

2. The method according to claim 1, wherein the reception modes include two or more of:
a first reception mode for causing the antenna units to receive an identical layer and combining the received identical layer;
a second reception mode for causing the antenna units to receive different layers of antenna units having channel orthogonality of a predetermined level or more; or
a third reception mode corresponding to a combination of the first reception mode and the second reception mode.

3. The method according to claim 1,
wherein, when a set having a common RI and a common PMI is not present among the primary CSIs, the secondary CSI is determined based on a combination of transmission beams corresponding to the RI, PMI, and CQI sets of the primary CSIs.

4. The method according to claim 1, wherein the primary CSIs include information on correlation between a predetermined number of rank indicator (RI), precoding matrix index (PMI), and channel quality indicator (CQI) sets having quality of a predetermined level or more and transmission beams.

5. The method according to claim 1, further comprising:
receiving information about selection of the reception modes from the network.

6. The method according to claim 1,
wherein the primary CSIs include a predetermined number of rank indicator (RI), precoding matrix index (PMI), and channel quality indicator (CQI) sets having quality of a predetermined level or more.

7. A user equipment (UE) operating in a wireless communication system, the UE comprising:
a plurality of antenna units positioned at distributed locations of the UE;
a central unit connected to the antenna units to determine reception modes for each of the antenna units based on combined gain of primary CSIs measured in the antenna units and determine secondary CSI based on the determined reception mode; and a transceiver connected to the central unit to report information on the reception mode determined by the central unit and the determined secondary CSI to a network, wherein the primary CSIs include a predetermined number of rank indicator (RI), precoding matrix index (PMI), and channel quality indicator (CQI) sets having quality of a predetermined level or more, wherein the secondary CSI is determined based on a data rate requirement parameter value and a link stability requirement parameter value, wherein the link stability requirement parameter value is related to a degree of importance of link stability and the data rate requirement parameter value is related to a degree of importance of data rate, wherein the secondary CSI is determined based on a set having a common RI and a common PMI among the primary CSIs, when a difference between the data rate requirement parameter value and the link stability requirement parameter value is less than a threshold, and wherein the secondary CSI is determined based on a set having a largest CQI among the primary CSIs, when the difference between the data rate requirement parameter value and the link stability requirement parameter value is equal to or greater than the threshold.

8. The UE according to claim 7, wherein each of the antenna units is configured to additionally generate information on correlation between each of the predetermined number of RI, PMI, and CQI sets and a transmission beam.

9. The UE according to claim 7, wherein, when a set having a common RI and a common PMI is not present among the primary CSIs, the central unit is configured to determine the secondary CSI based on a combination of transmission beams corresponding to the RI, PMI, and CQI sets of the primary CSIs.

* * * * *